G. RICHARDSON.
Animal-Traps.

No. 157,973.

Patented Dec. 22, 1874.

Witnesses;
Edward Halsey
Charles W. Halsey

Inventor;
Garrios Richardson

THE GRAPHIC CO. PHOTO-LITH. 39 & 41 PARK PLACE, N.Y.

UNITED STATES PATENT OFFICE.

GAMOS RICHARDSON, OF SAN JOSÉ, CALIFORNIA.

IMPROVEMENT IN ANIMAL-TRAPS.

Specification forming part of Letters Patent No. 157,973, dated December 22, 1874; application filed May 12, 1874.

*To all whom it may concern:*

Be it known that I, GAMOS RICHARDSON, of the city of San José, county of Santa Clara and State of California, have invented certain Improvements in Animal-Traps, of which the following is a specification:

The nature and object of my invention are the novel combination of various devices to form a trap for ground-squirrels, gophers, and other animals, as will be hereinafter explained.

Figure 1:
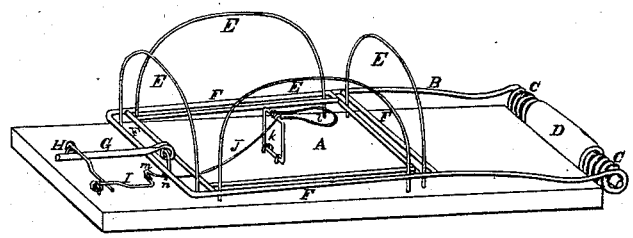
Figure 2:
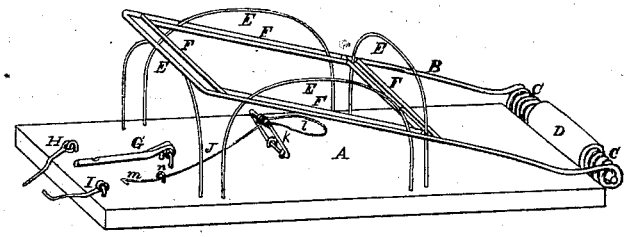

Figure 1 is a perspective view of the trap as set. Fig. 2 is a view of the trap sprung.

A is the floor of the trap. B is the flying-bar, which is a piece of wire, the ends of which are coiled around a barrel, D, and secured thereto, for the purpose of forming a spring, as at C C. The barrel is secured to the end of the floor by means of screws or nails. The flying-bar is constructed of a number of bars in the form of a square, as at F F F F, so that the loops E E E E may pass between each pair of bars of the four sides of the square. The loops E E E E, through which the animal passes its head in order to get at the bait, are firmly secured to the floor. G, H, and I are pieces of wire, which, together with the trigger J, form the lock, and are secured to the floor by means of eyes, in the position shown. J is the trigger, the end *l* of which is a loop attached to a swinging bar, K, secured to the floor by means of eyes. The end *m* of the trigger passes through an eye, *n*, which serves to keep it in proper position.

In setting the trap the bar B is brought down, the loops E E E E passing between the parallel bars, forming the sides of the square. The wire G is passed forward over the outer bar and under the wire H, which, in turn, is placed under the wire I, and the wire I placed under the end *m* of the trigger J. The bait is placed under and around the swinging bar K, and any disturbance of the trigger causes the trap to spring.

The floor of the trap is intended to be set flush in the ground.

I claim as my invention—

The combination of the floor A with the bar B, the springs C C, the barrel D, the loops E E E E, the lock G H I, the trigger J, and swinging bar K, substantially as and for the purposes hereinbefore set forth.

GAMOS RICHARDSON.

Witnesses:
 EDWARD HALSEY,
 CHARLES W. HALSEY.